Aug. 26, 1952     T. A. ST. CLAIR     2,608,210

RELIEF VALVE

Filed Aug. 30, 1948

INVENTOR.
T.A. ST. CLAIR
BY Hudson & Young
ATTORNEYS

Patented Aug. 26, 1952

2,608,210

UNITED STATES PATENT OFFICE 2,608,210

RELIEF VALVE

Theodore A. St. Clair, Pontiac, Mich., assignor to Phillips Petroleum Company, a corporation of Delaware Application August 30, 1948, Serial No. 46,898

2 Claims. (Cl. 137—541)

This invention relates to pressure relief valves. In one of its more specific aspects it relates to positive closure pressure relief valves adapted to avoid leakage at pressures approaching that at which the valve opens.

In conventional relief valves there is frequently a tendency for the valves to leak as pressure approaches the valve opening pressure. In many such valves this leakage is appreciable and over periods of time product loss may reach a sizable figure. In case of hydrocarbon gas storage or storage of other inflammable or noxious gases leakage may present hazards especially in enclosed areas.

One object of my invention is to provide a non-leaking pressure relief valve.

Another object of my invention is to provide a pressure relief valve so designed that the higher the pressure upon the valve mechanism, the tighter will be the seal against leakage until the valve opening pressure is reached.

Another object of my invention is to provide a non-leaking pressure relief valve which is simple and inexpensive to manufacture.

Still another object of my invention is to provide a non-leaking pressure relief valve which may be adjusted to relieve pressures within conventional working ranges.

Still other objects and advantages of my invention will be apparent upon reading the following disclosure and attached drawing which respectively describes and illustrates a preferred embodiment of my invention.

Figure 1:
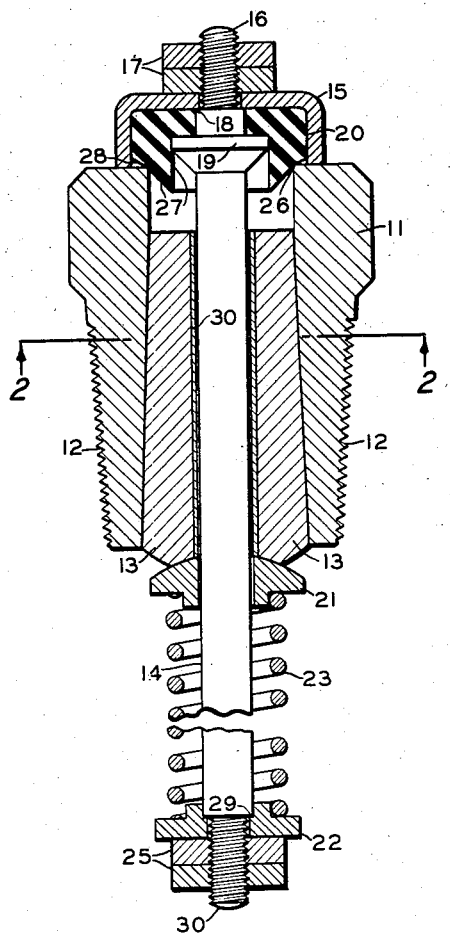
Figure 2:
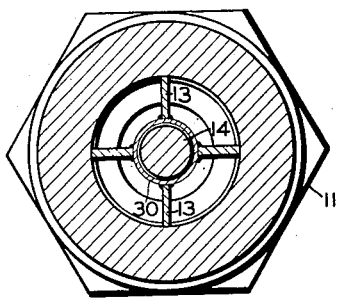

In the drawing, Figure 1 is a longitudinal view, partly in section, of my relief valve. Figure 2 is a cross-sectional view of the body member of my relief valve taken on a line 2—2 of Figure 1.

Referring now to the drawing, reference numeral 11 refers to an annular body member of my valve. This body member is provided with a threaded section 12 for installation of the valve into a cylinder or tank. Positioned in the central opening of this annular member are some fins 13 which are disposed longitudinally. These fins extend radially inward for some distance but terminate at a fixed distance from the longitudinal axis of this annular body member as may be seen in the figures. These fins extend beyond the large diameter end of the body member 11 a short distance and the ends may be shaped as illustrated in Figure 1 for contact with a spring retainer 21. The other ends of the fin members terminate at some little distance from the other end of the annular body member so that they will not interfere in any manner with the opening or closing of the valve mechanism.

Disposed within the annular body member and along the axis thereof is a valve stem 14. The end of the valve stem which carries the valve closure means has a flange 19, a shoulder 18, and a threaded section 16, as may be seen in Figure 1. A resilient gasket member 20 may be fitted or placed against the flange 19, then a cap 15 placed, as shown, against the shoulder 18. A pair of lock nuts 17 may then be installed upon the threaded section 16 to hold the cap member 15 and the resilient gasket member 20 firmly in place.

As illustrated the fins 13 may be attached to a cylindrical sleeve 30 which surrounds the valve stem.

At the opposite end of the valve stem 14 is a shoulder 29 and a threaded section 30. A spring retainer 21 may be installed as shown and a compression spring 23 placed around the valve stem and against this first spring retainer 21. The spring is followed by another spring retainer 22 which then may be locked or held firmly in its proper position by a pair of lock nuts 25.

In the operation of my pressure relief valve for the relief of pressures above any predetermined working pressure, the pressure enters the valve body and is transmitted longitudinally through the body and between the fins to the acute angle side or surfaces 27 of the resilient gasket 20. Since fluid pressure exerts itself at right angles or normal to the surface with which it is in contact, the tendency is to force the acute angle portion 27 of this resilient gasket outward in the direction of lower pressure, which may be atmospheric pressure. This tendency to force the gasket in the direction of low pressure tends to compress this portion of the gasket and pushes the surface 28 tightly against the circular edge 26 of the valve body. This circular edge of the valve body may be considered the valve seat. This valve seat may be substantially a true edge or the edge may be beveled slightly to increase the area of the bearing surface between the gasket surface 28 and the seating surface.

The cap 15 is so constructed and positioned in my valve assembly that practically the entire differential load of the spring 23 is absorbed by the metal cap member 15 in its contact with the body member. This cap member is intended to absorb this spring loading effect so as not to unduly distort the normal shape of the resilient gasket member 20. It will be obvious that the greater the pressure on the gasket surfaces 27, the greater will be the tendency to compress the gasket or to force it in the direction of lower pressure and the greater this tendency of compression, the greater will be the seating effect between the beveled surface of the gasket and the seat 26.

The lock nuts 17, which of course are easily removable, permit easy and rapid replacement of gasket member 20 when such replacement becomes necessary.

The shoulder 18 then permits the cap 15 to be replaced into its fixed and predetermined position.

The shoulder 29 on the opposite end of the valve stem 14 fixes the position of the outer end of the compression spring while the curved ends of the fin members 13 fix the position of the opposite end of the compression spring. In the manufacture and operation of such pressure relief valves, it is preferable to use springs of different compressive strengths for relief of different pressures.

Other means than the threaded ends 16 and 30 with their respective pairs of lock nuts 17 and 25 may be used for holding the cap 15 and the spring retainer 22, respectively, in their proper positions. For example, cotter key assemblies may be used.

The lock nut assembly 25 may be used on its end of the valve stem without the shoulder 29, if desired, to compress the compression spring 23, and when so compressed the valve then is set to open at a higher pressure than previously. However, I prefer to use the shoulder 29 with the pair of lock nuts 25 and spring retainer 22 as shown so that the compression spring 23 may be manufactured of a definite length and compressibility, and then to adjust the valve for opening at a higher or lower pressure it is only necessary to remove the lock nuts 25, the retainer 22, and replace the spring with a spring having any desired compressive strength.

The resilient gasket 20 may be made of natural rubber, if desired, provided this material will not soften or disintegrate in the presence of liquids or vapors with which it might come in contact. If my valve is to be used for relieving pressures of hydrocarbons in storage, it may be preferable to use gaskets of synthetic rubber or other elastomer which is not effected or softened by contact with hydrocarbons. It is merely necessary to provide the gasket of a material which will withstand the solvent or other action of the liquid or gas with which it comes in contact. Materials of construction of the remainder of the valve may be selected from among those commercially available, taking into account, of course, corrosive action of liquids or vapors with which the valve may come in contact. The compression spring 23, of course, should be made of material which will withstand compression without permanent deformation.

Having disclosed my invention, I claim:

1. A fluid pressure relief valve comprising in combination a body, a valve seat in said body having a flat seating surface containing a fluid conduit in and normal to said surface and thereby forming a sharp sealing shoulder on said seat between said surface and said conduit, a valve guided in said body and biased to close against said seat to prevent fluid flow through said conduit until a predetermined pressure differential across said valve is exceeded, said valve comprising a metal cap member disposed to seat on said flat seating surface, said cap member having a cavity therein, and an annular resilient gasket secured to said cap and disposed in said cavity so as to engage and seal against said sharp sealing shoulder of said seat, said annular gasket being beveled so that it is a frusto conical surface that seals against said shoulder whereby a relief space is provided between said flat surface, said cap, said gasket and said shoulder when said valve is closed and under zero pressure differential and whereby fluid pressure may force more or less of said resilient gasket into said space and increase the seal without moving said cap from said surface, or breaking said seal until said predetermine pressure differential across said valve is exceeded.

2. A fluid pressure relief valve comprising in combination a body, a valve seat in said body having a flat seating surface containing a fluid conduit in and normal to said surface and thereby forming a sharp sealing shoulder on said seat between said surface and said conduit, a valve guided in said body and biased to close against said seat to prevent fluid flow through said conduit until a predetermined pressure differential across said valve is exceeded, said valve comprising a metal cap member disposed to seat on said flat seating surface, said cap member having a cavity therein, and an annular resilient gasket secured to said cap and disposed in said cavity so as to engage and seal against said sharp sealing shoulder of said seat, said annular gasket being beveled so that it is a frusto conical surface that seals against said shoulder whereby an enclosed relief space is provided between said flat surface, said cap, said gasket and said shoulder when said valve is closed and under zero pressure differential and whereby fluid pressure may force more or less of said resilient gasket into said space and increase the area of contact between the gasket and said flat seating surface without moving said cap from said surface, or breaking said seal until said predetermined pressure differential across said valve is exceeded.

THEODORE A. ST. CLAIR.

REFERENCES CITED

The following references are of record in the file of this patent:

UNITED STATES PATENTS

| Number | Name | Date |
|---|---|---|
| 874,652 | Bailey | Dec. 24, 1907 |
| 1,665,394 | Willoughby | Apr. 10, 1928 |
| 1,774,690 | Willoughby | Sept. 2, 1930 |
| 1,963,685 | Shimer | June 19, 1934 |
| 2,018,288 | Steinly | Oct. 22, 1935 |
| 2,107,200 | Kennon | Feb. 1, 1938 |
| 2,403,028 | Smith | July 2, 1946 |
| 2,482,198 | Melichar | Sept. 20, 1949 |